US011836010B2

(12) United States Patent
Thome

(10) Patent No.: US 11,836,010 B2
(45) Date of Patent: Dec. 5, 2023

(54) ADJUSTABLE DEVICE FOOT

(71) Applicant: Microsoft Technology Licensing, LLC, Redmond, WA (US)

(72) Inventor: Nathan Michael Thome, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/769,970

(22) PCT Filed: Oct. 21, 2020

(86) PCT No.: PCT/US2020/056724
§ 371 (c)(1),
(2) Date: Apr. 18, 2022

(87) PCT Pub. No.: WO2021/081134
PCT Pub. Date: Apr. 29, 2021

(65) Prior Publication Data
US 2022/0382326 A1    Dec. 1, 2022

(30) Foreign Application Priority Data
Oct. 21, 2019   (NL) ...................................... 2024062

(51) Int. Cl.
*G06F 1/16* (2006.01)
(52) U.S. Cl.
CPC .................................... *G06F 1/166* (2013.01)
(58) Field of Classification Search
CPC ............................. G06F 1/166; H05K 5/0234
See application file for complete search history.

(56) References Cited

U.S. PATENT DOCUMENTS 7,643,277 B2    1/2010 Tang
7,898,802 B2 *  3/2011 Lian ...................... G06F 1/1616
108/50.01
(Continued)

FOREIGN PATENT DOCUMENTS

| CN | 201174070 Y | 12/2008 |
| CN | 201845286 U | 5/2011 |
| WO | 2018089018 A1 | 5/2018 |

OTHER PUBLICATIONS

"Search Report and Written Opinion Issued in Netherlands Patent Application No. N2024062", dated Aug. 7, 2020, 12 Pages.
(Continued)

*Primary Examiner* — James Wu
(74) *Attorney, Agent, or Firm* — NovoTechIP International PLLC

(57) ABSTRACT

An improved method and system for providing an adjustable foot (155) for an electronic device is disclosed. The electronic device may include a base (150), at least a foot (155) containing a portion being movable relative to the base between a first configuration and a second configuration, a magnetic element for moving said movable portion of the foot between the first configuration and the second configuration, and a display element (140) movably connected to the base, where the movement of the display element (140) from a first position to a second position causes the magnetic element to move the movable portion from the first configuration to the second configuration.

15 Claims, 7 Drawing Sheets

(56) References Cited

U.S. PATENT DOCUMENTS

| | | |
|---|---|---|
| 8,213,177 B2 | 7/2012 | Uttermann et al. |
| 8,300,406 B2 | 10/2012 | Chen et al. |
| 10,809,770 B2* | 10/2020 | Huang .................... G06F 1/166 |
| 2009/0180268 A1 | 7/2009 | Guo |
| 2011/0222233 A1* | 9/2011 | Lu .......................... G06F 1/166 |
| | | 361/679.21 |

OTHER PUBLICATIONS

"International Search Report and Written Opinion Issued in PCT Application No. PCT/US20/056724", dated Feb. 2, 2021, 16 Pages.

* cited by examiner

ADJUSTABLE DEVICE FOOT

TECHNICAL FIELD

This disclosure relates generally to adjustable feet for an electronic device and, more particularly, to a system and method of adjusting the friction of feet provided for an electronic device in different modes.

BACKGROUND

In recent years, there has been an increase in the number of consumer electronic devices that offer multiple modes and functionalities. For example, some personal computers now offer a laptop mode and a tablet mode. Each of these modes may offer different types of functionalities and may require a different type of device set up. Because of these different setups, the same external configuration may not work properly in every setup. This may lead to user frustration and inconvenience.

Hence, there is a need for adjustable external components for use in electronic devices.

SUMMARY

Apparatuses and methods of a movable foot for an electronic device are described. In one general aspect, the instant disclosure presents an electronic device which includes a base, at least foot being movable relative to the base between a first configuration and a second configuration, a magnetic element for moving the portion of the foot between the first configuration and the second configuration, and a display element movably connected to the base, where the movement of the display element from a first position to a second position causes the magnetic element to move the portion from the first configuration to the second configuration.

In another general aspect, the instant application describes a method for moving a foot connected to an electronic device. The method may include positioning a display element movably connected to a base of the electronic device in a first position, the first position causing the foot to move from a first configuration relative to the base to a second configuration relative to the base. The device may include a magnetic element for moving the foot between the first configuration and the second configuration, and positioning the display element in the first position causes the magnetic element to move the foot from the first configuration to the second configuration In yet another general aspect, the instant application describes a method for providing a movable foot for an electronic device. The method may include providing a first material and a second material, forming a first portion of the foot from the first material, forming a second portion of the foot from the second material, attaching the foot to a base of the electronic device, providing a magnetic element for moving the foot between a first configuration and a second configuration, and positioning at least a portion of the magnetic element proximate to the first portion.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
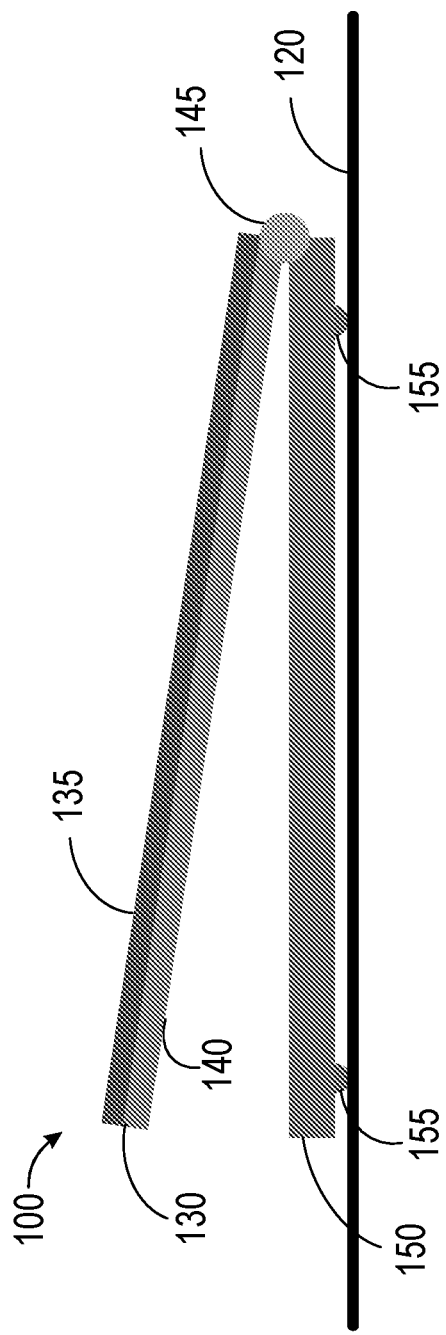
FIG. 1A depicts a side-view of a schematic representation of a device which provides multiple modes of operation, during a first mode.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings Most personal computer devices such as laptops include one or more feet that provide a sufficient level of friction with a surface on which the device is seated. The level of friction provided may be advantageous in a number of ways. For example, it may prevent the device from sliding on the surface, when a user places his/her hand on the keyboard to type. It may also prevent the device from sliding, when a user attempts to open a laptop by pushing against the top portion (e.g., display screen). Without the sufficient level of friction, it may be difficult to open the laptop since the bottom surface of the laptop may simply slide on the surface when pressure is exerted on the laptop it to open it. Thus, one or more elements (e.g., feet) providing an additional amount of friction are often attached to the bottom surface. However, if the device provides multiple modes and can be used as a tablet, the amount of friction generated between the feet and the surface may be undesirable in the tablet mode. For example, the friction may make it difficult to rotate the device in the tablet mode. This may be particularly inconvenient when the device is being used to create a digital drawing. Instead of being able to simply move the device in different directions on the surface, the user may have to pick up the device and turn it. This can lead to a frustrating experience.

To address these problems and more, a solution may be provided that includes an adjustable device foot that automatically adjusts the amount of friction generated between the device and a surface on which the device is placed, depending on the device mode. In one implementation, a foot integrated into the bottom surface of the device may include a low friction area and a high friction area. The low friction area may generate a minimal amount of friction between the device and the surface, while the high friction area may generate a larger amount of friction that is sufficiently high to keep the device in place, when desired. The low friction portion may be manufactured from materials having a low coefficient of friction, while the high friction portion may be manufactured from materials having a high coefficient of friction. To provide an adjustable amount of friction, the high friction portion may be retractable. In one implementation, the high friction portion can be retracted by using a magnetic mechanism which may include two magnets. One of the magnets may be placed behind the high friction portion on the bottom surface of the base of the device and the other magnet may be placed inside the top portion of the device. When the top portion is positioned on the base in a tablet mode, the two magnets may align, thus causing them to attract and as a result, pulling the high friction area inward, thereby retracting the high friction area.

As will be understood by persons of skill in the art upon reading this disclosure, benefits and advantages provided by such implementations can include, but are not limited to, a solution to the problem of an undesirable amount of friction between a device and a surface on which the device is placed in different device modes. Solutions and implementations provided here improve the user's experience by providing an adjustable foot that offers an adjustable amount of friction depending on the user's needs. Moreover, the design is simple and inexpensive to implement, thus saving design and production costs.

Referring now to the drawings, FIG. 1A depicts a side-view of a schematic representation of a device 100, which provides multiple modes of operation, during a first mode of operation. In one implementation, the device 100 is a personal computer which provides a laptop mode and a tablet mode. In FIG. 1A, device 100 is being used as a laptop with a top element 130 of the device 100 being partially lifted off from a base 150. The top element 130 may include an external casing 135 and a display screen 140. The external casing 135 may provide a housing for the display screen 140 and various other components that may be used in the top element 130 of the device 100.

The base 150 may include a keyboard on the top surface and multiple feet 155 on the bottom surface, among other features. In one implementation, the base forms an external casing of a portion of the device 100 with an internal volume for housing various computing elements. The external casing of the base may be formed from materials such as metals, plastics or polymers. The base 150 may be connected to the top element 130 via a connecting element 145. In an example, the connecting element 145 may be a hinge. In another example, the connecting element 145 may be a kickstand that allows the device to easily transition from laptop mode to tablet mode by sliding the top element backwards on top of the base. The connecting element 145 may enable the device 100 to provide multiple modes of operation. For example, the connecting element 145 may allow the top element 130 to be moved from a horizontal closed position to a vertical position to provide a laptop mode, when the display screen 140 faces the top surface of the base 150. The connecting element 145 may also function to enable the top element 130 to move to a horizontal open position, where the external casing 135 faces the top surface of the base 150, thus providing a tablet mode.

The feet 155 may be attached to the bottom surface of the base to provide a frictional force between the device and an object 120 such as a table on which the device is placed. Because the amount of frictional force needed for the device to properly function during different modes may be different, the feet 155 may provide an adjustable amount of friction, as further discussed below.

Figure 1B:
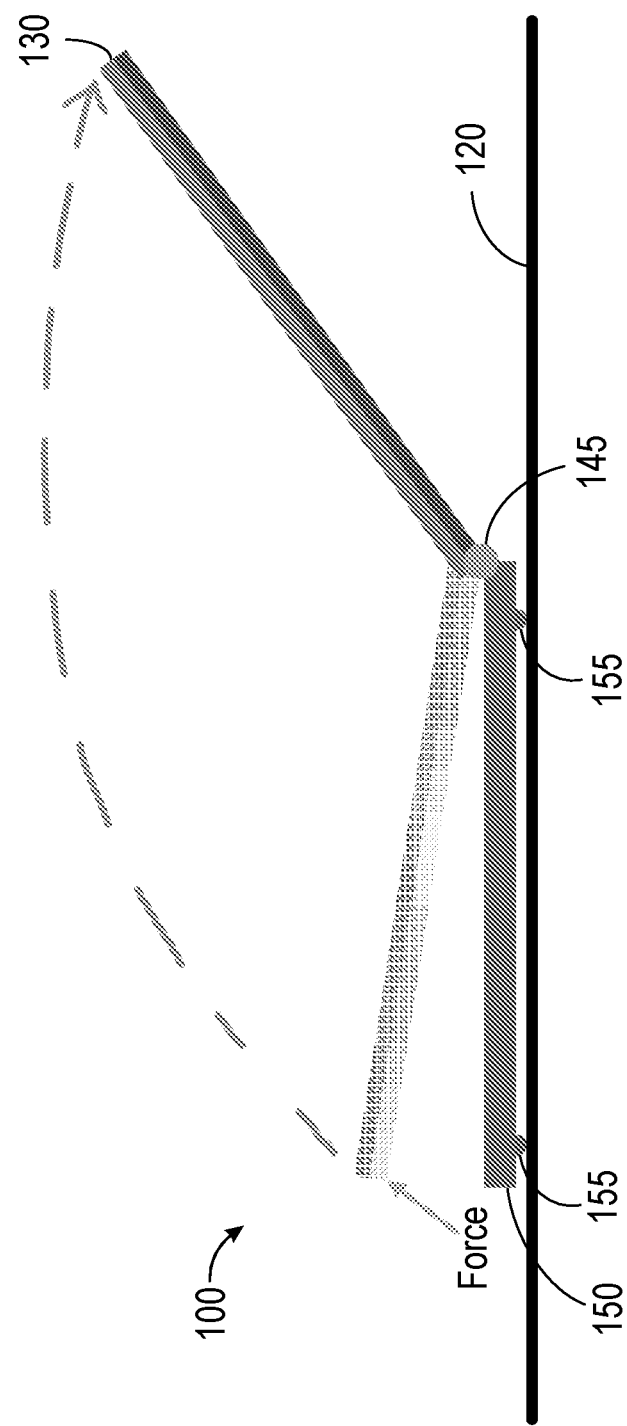
FIG. 1B depicts an alternative side-view of a schematic representation of the device, during a first mode.

FIG. 1B depicts an alternative side-view of a schematic representation of the device 100 as it is being opened for a laptop mode operation. When a user desires to begin using the device 100, and the device 100 is in a closed position (e.g., when the top element is positioned on the base with the display screen facing the top surface of the base), the user may exert a force to the top element 130 in the vertical direction (e.g., the z direction). The force applied to the top element 130 may cause the top element 130 to move from the horizontal closed position in which it is located to a vertical or upright position.

The amount of force required to move the top element 130 to a desired upright position from the closed position may vary for devices of various sizes and weight. However, for most devices, because the top element 130 is connected to the base 150, any amount of force applied to the top element 130 may result in an amount of force also being applied to the base 150. If the amount of friction between the base 150 and the object 120 on which the base 150 is located is not sufficient, the directional force applied to the base 150 may cause the base 150 to slide backwards on the object as the device is being opened. This is undesirable and can lead to an inconvenient and frustrating user experience. For example, this may require the user to hold the base with one hand, while applying pressure to the top element with the other hand, thereby preventing the user from opening the device with one hand. The feet 155 may provide the frictional force required to prevent movement of the base on the object as it is being opened. While this may be advantageous during a laptop mode operation, the frictional force that prevents the device from sliding on the object may be too high for use of the device during tablet mode operations. The adjustable feet 155 address this problem by providing a retractable portion that results in adjustable friction.

Figure 2:
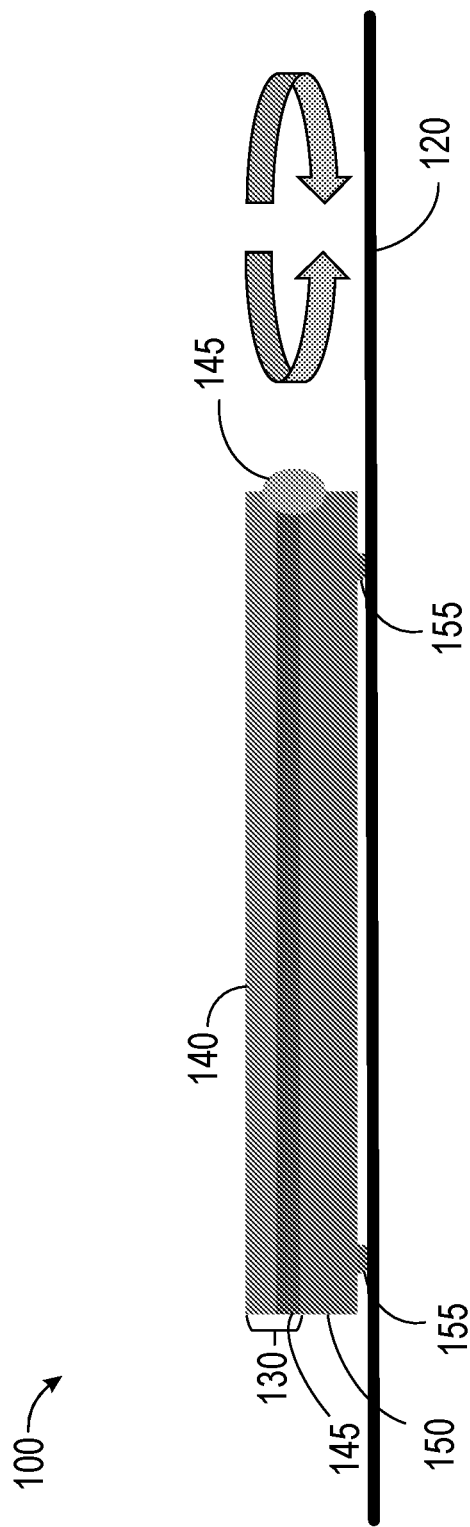
FIG. 2 depicts a side-view of a schematic representation of the device, during a second mode of operation.

FIG. 2 depicts a side-view of a schematic representation of the device 100 during a second mode of operation. The second mode may be a tablet mode during which the top element 130 is positioned on the base 150 in a manner that allows the display screen 140 to be on top and facing outward. This may turn the device 100 into a tablet that can be used for example with a digital pen for quick note taking and/or creating digital drawings. In one implementation, placing the top element in this position may cause one or more high friction portions of feet 155 to retract into recess areas within the base 150, thereby adjusting the coefficient of friction between the feet 155 and the object 120. By retracting the high friction portions, the coefficient of friction may be reduced from the previous high frictional force to a lower amount that allows for easier movement of the device 100 on the surface of the object. As a result, the device 100, when placed in a tablet mode may be easily movable and rotatable on the object 120, as shown.

Figure 3A:
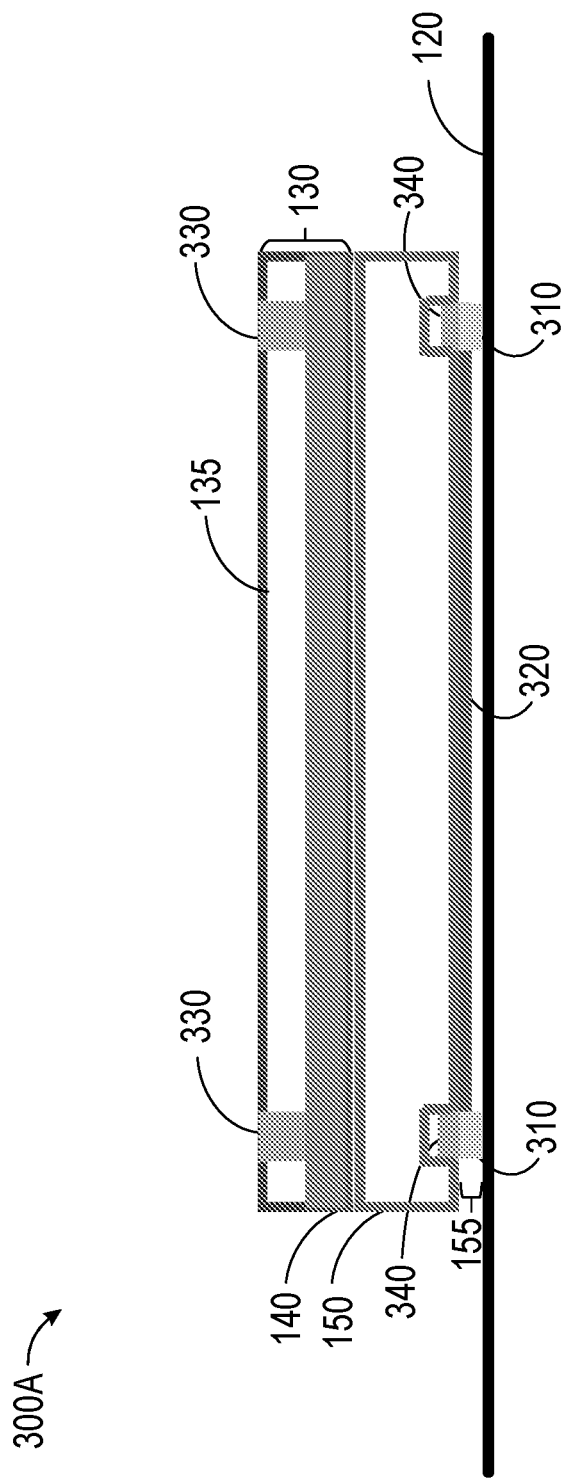
FIGS. 3A-3B depict side-views of simplified schematic representations of an adjustable foot for a device which provides multiple modes of operation.

FIG. 3A depicts a side-view 300A of a simplified schematic representation of an adjustable foot 155 for the device 100, when the device 100 is in a closed position. In this position, the top element 135 is placed on the base 150 with the external casing 135 on the external side of the device, while the display screen 140 faces the top surface of the base 150. The base 150 may include an adjustable foot 155 connected to its bottom surface. In one implementation, the adjustable foot 155 may include two high friction portions 310 and a low friction portion 320. Thus, the adjustable foot 155 may be made from pliable material with varying coefficients of friction across the surface. The high friction portions 310 may be located at the ends, while the low friction portion 320 is located in between the two high friction portions 310. In one implementation, the low friction portion of the feet is made from polycarbonates (PC) materials, while the high friction portions are made from an Acrylonitrile butadiene styrene (ABS) blended material. In an example, the PC material is a Polyether-Ester Block Copolymer (TEEE/COPE) glass fiber, while the ABS blended material is a CYCOLOY™ CX7240 Polycarbonate/Acrylonitrile Butadiene Styrene (PC/ABS) blend which is injection moldable. In another example, silicon-based materials are used for one or more portions of the feet. In another implementation, the low friction portion is made from a type of PC material, while the high friction portions are made a ABS/PC blended material that has a higher coefficient of friction than the PC material used for the low friction portion. Other configurations are also possible. For example, the low friction portion and high friction portions may both be made from different types of PC materials that have different coefficients of friction. Similarly, the low friction portion and high friction portions may be made from different blends of PC-ABS materials with different coefficients of friction.

In one implementation, the low friction portion 320 is attached to the bottom of the base 150, for example by adhesion, soldering, pressure, heat, or any other method of attaching two materials, while the high friction portions 310 are attached to the magnets 340 that are located within the base 150. In an example, the high friction portions 310 are adhered to the magnets 340 and the magnets 340 are positioned in a recess area of the bottom surface of the base 150. The recess area may have a height that allows the magnet to move up and down within the recess area, as needed. In an alternative implementation, the magnets 340 may be located inside the base 150, but still attached to the high friction portion 310 via for example an opening on the bottom surface of the base 150. When the magnets 340 are located inside the base 150, they may be positioned such that an area located above them allows for vertical movement of the magnets 340.

In one implementation, the high friction portions 310 may be attached to the ends of the low friction area 320 and those ends may be attached to the magnets 340. In such an implementation, the low friction portion 320 may be made from a flexible material that is bendable such that when the magnets 340 move up, the ends of the low friction portion 320 can bend upwards, thus pivoting the attached high friction portions 310 with them. It should be noted that although adhesion is used as an example of a mechanism for attaching the low friction portion 320 to the base and attaching the high friction portions 310 to the magnets 340, any other known mechanism for attaching components to each other may be used. For example, the high friction portions 310 may be attached to the low friction area by bonding, soldering, pressure or heat.

Figure 3B:
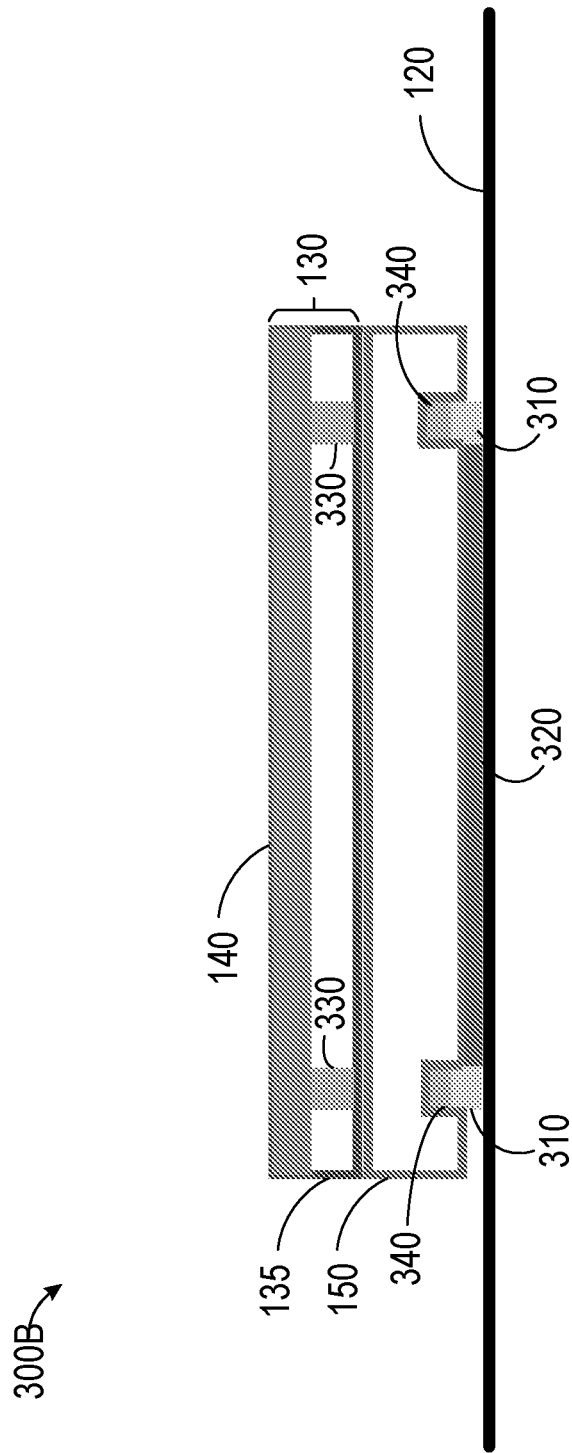

In one implementation, the device 100 may include a mechanism for enabling the high friction areas of the foot 155 to be retractable. In an example, this is achieved by using the magnets 330 located in the top element 130 and the magnets 340 located in the base. This is illustrated in FIG. 3B which depicts a side-view 300B of a simplified schematic representation of the adjustable foot 155, when the device 100 is in a tablet mode. The magnets 330 may be positioned within the external casing 135 of the top portion such that they face the base 150 when the device is in the tablet mode. Thus, the magnets 330 and magnets 340 maybe positioned within the device 100, such that their opposite poles face each other, when the device is placed in the tablet mode. This may cause the opposite poles of the magnets 330 and 340 to attract each other, thus causing the magnets 340 (which are movable) to move up towards the magnets 330. Because the high friction portions 310 are attached to the magnets 340, this may cause the high friction portions 310 to pivot inwards, thus retracting the high friction portions. This may prevent the high friction portions 310 from having direct contact with the object 120, thus decreasing the amount of friction between the device and the object and enabling easier movement of the device on the object. In another example, the high friction portions 310 may still have some contact with the object, even after they have been retracted, but because the high friction portions 310 are now at the same level (e.g., same height) as the low friction portion 320, the total amount of friction caused by the entire area of the foot 155 may be decreased, thus enabling easier movement of the base on the object 120. This provides a simple inexpensive mechanism for providing an adjustable foot which automatically provides varying amounts of friction during different modes.

In one implementation, either magnet 330 and/or magnet 340 could be replaced by an object made from high ferrous grade steel. In such an implementation, the high ferrous grade steel would produce the magnetic attraction force needed to pull the high friction area of the foot upwards. In an example, 400 series stainless steel (e.g., SUS 430) is used instead of one or both of the magnets. Furthermore, although two separate magnets are used in the above implementations for providing the magnetic force required to retract a portion of the device foot, any other magnetic mechanism may be used. In an example, a magnetic actuator may be utilized.

In one implementation, to prevent debris and in particular metal debris to enter the device or interfere with the magnets, a flexible sealing element such as a form sheet metal or a flexible gasket may be used. It should be noted that although, FIGS. 3A-3B display magnets as the mechanism used for retracting the high friction portions of the foot, many other configurations for providing retractable/pivotable high friction portions are contemplated.

Figure 4:
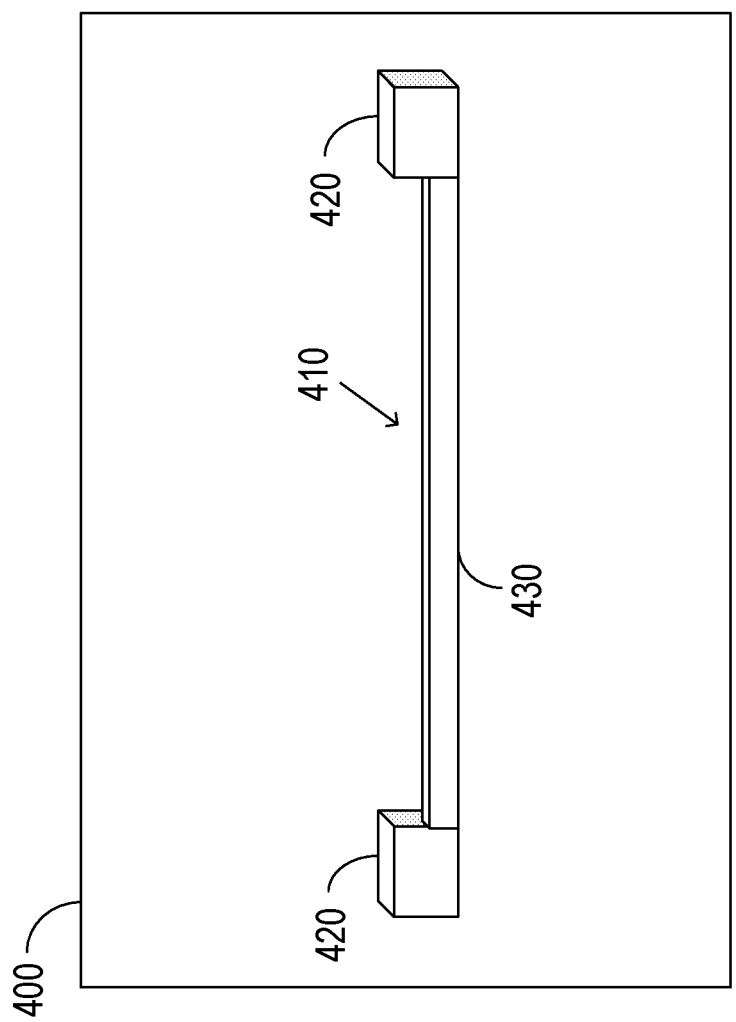
FIG. 4 is a schematic representation of an adjustable foot used for an electronic device.

FIG. 4 is a schematic representation of a bottom surface 400 of a device having an adjustable foot 410. The adjustable foot 410 includes a low friction portion 430 which is an elongated portion. This low friction portion 430 is attached at its two ends to two high friction portions 420 that are longer in height than the low friction portion. As discussed before, the high friction areas 420 may be retracted resulting in the low friction portion 430 and the high friction portions 420 having substantially the same height protruded from the bottom surface, or the high friction portion having a shorter height protruded from the bottom surface 400. As a result, the adjustable foot may include one or more portions that are movable relative to the external case of the device to which they are attached.

It should be noted that although only one adjustable foot 410 is displayed, two or more adjustable feet may be used. For example, instead of having one adjustable foot 410 in the middle of the bottom portion, two adjustable feet 410 may be used, each of which may be positioned closer to one edge of the bottom surface. In one implementation, instead of the adjustable foot being parallel with the width of the bottom surface, the adjustable foot/feet 410 may be positioned in parallel to the length of the bottom surface. In another example, one or more adjustable feet may be positioned diagonally with respect to the bottom surface. Furthermore, in one implementation, instead of being placed at the ends of the low friction portion, the high friction portions 420 may be located at other points along the low friction portion of the foot 410. For example, one high friction area may be located in the middle of the low friction portion 430, while the other high friction area 420 is located at one end. In another example, more than two high friction portions may be used. Still further, in one implementation, the high friction portions may be separate from the low friction portion. For example, a device may include one or more non-movable low friction feet and one or more retractable high friction feet that are not attached to each other or positioned adjacent to each other. Regardless of the number and location of the high friction portions, as long as a mechanism such as the magnets discussed above for retracting the high friction portion is provided, feet having adjustable friction may be provided for different device modes.

Figure 5:
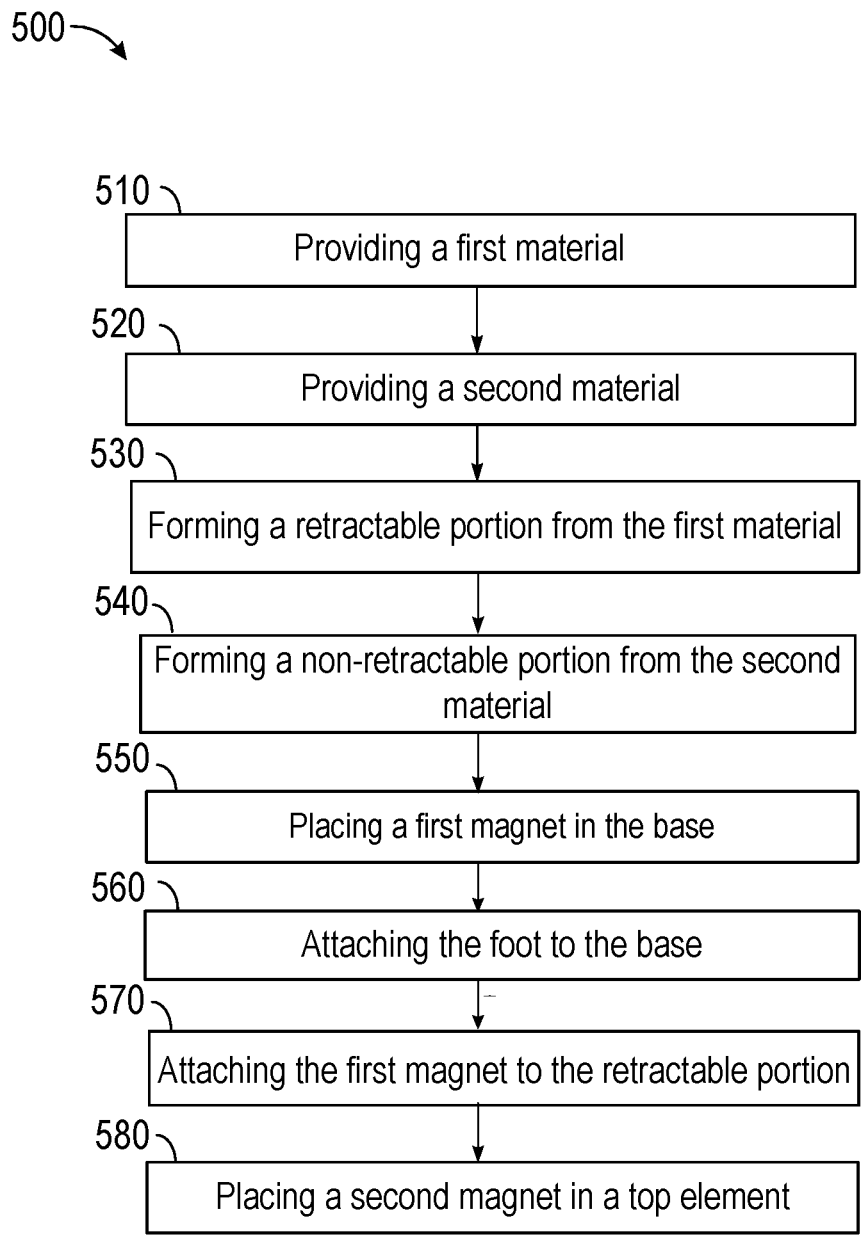
FIG. 5 is a flow diagram for a method for manufacturing a foot having a retractable portion for an electronic device.

FIG. 5 is a flow diagram depicting an example method 500 for manufacturing a foot having a retractable portion for an electronic device, such as the electronic device 100 of FIGS. 1-2. At 510, the method 500 may begin by providing a first material before proceeding to provide a second material, at 520. The first and second materials may be materials suitable for manufacturing an adjustable foot for an electronic device. In an example, the first material may have a higher coefficient of friction than the second material. Each of the first and the second material may be pliable materials that provide a degree of flexibility. In an example, each of the first and the second material may be formed using an injection molding process.

After providing the first and the second materials, method 500 may proceed to form a retractable portion of a device foot from the first material, at 530, before forming a non-retractable portion of the foot from the second material, at 540. As discussed above, this may provide a foot having varying degrees of friction in different modes. Once the retractable and non-retractable portions have been made, method 500 may proceed to place a first magnet inside the base of the electronic device, at 550. In one implementation, the magnet is positioned within a hollow area. The hollow area may be within the interior portion of the external casing of the base. The retractable and non-retractable portions of the foot may then be attached to the bottom of the external casing of the base, at 560. This may be done via an adhesion mechanism, bonding, soldering, pressure, heat or any other known mechanism for attaching two materials. In one implementation, the non-retractable portion is attached to the base, while the retractable portion is attached to the non-retractable portion. In another example, instead of or in addition to attaching the retractable portion to the base, the retractable portion is attached to the first magnet, at 570. This ensures that when the magnet moves as a result of attraction to an opposite pole, the retractable portion moves with it. To achieve this, method 500 may proceed to position a second magnet in the top element of the device, at 580. This may be done by placing the second magnet in an external casing of the top element such that the opposite pole of the second magnet faces the opposite pole of the first magnet, when the device is in a tablet mode. Thus, the process may result in a retractable adjustable foot for an electronic device which provides varying degrees of friction for the device for different modes.

In one implementation, the adjustable foot may be developed as a two-piece accessory that can be attached to a device, such as a laptop computer to provide retractable feet to customers who desire such a feature for their devices. For example, a retractable foot portion may be provided for attaching to a bottom surface of the device, while a second piece containing a magnet is provided for attaching to the top element of the device.

Apparatuses and methods of providing an adjustable foot for an electronic device are disclosed. In an implementation, the adjustable foot may provide a foot that changes the amount of friction generated between the foot and the surface of an object the device is seated on when transitioning between different device modes. Pliable material with varying degrees of friction may be used across the surface of the foot to provide an adjustable friction. Magnets may align between the top section of the device and the base to retract the high friction area of the foot when the device transitions to a tablet mode, thus providing flexibility and convenience of use for users.

(A1) In accordance with some implementations, an electronic device (100) includes a base (150), at least one foot (155), a magnetic element (330 and 340), and a display element (130) movably connected to the base (150). The magnetic element (330 and 340) is configured to move at least a portion of the at least one foot between a first configuration (e.g., shown in FIG. 3A) and a second configuration (e.g., shown in FIG. 3B). Movement of the display element from a first position (e.g., shown in FIG. 3A) to a second position (e.g., shown in FIG. 3B) causes the magnetic element (330 and 340) to move the at least one portion from the first configuration (e.g., shown in FIG. 3A) to the second configuration (e.g., shown in FIG. 3B).

(A2) In some implementations of the device of A1, the magnetic element includes a first magnet (340) housed within the base and a second magnet (330) housed within the display element (130).

(A3) In some implementations of the device of A2, movement of the display element (130) from the first position (e.g., shown in FIG. 3A) to the second position (e.g., shown in FIG. 3B) causes the first magnet (340) to align with the second magnet (330), thereby effecting movement of the at least one portion from the first configuration (e.g., shown in FIG. 3A) to the second configuration (e.g., shown in FIG. 3B).

(A4) In some implementations of the device of A3, the at least one portion is a first retractable portion and the foot (155) includes a second retractable portion, each of the first and the second retractable portions being positioned proximate to a corresponding first magnet (340).

(A5) In some implementations of the device of A4, the display element includes two second magnets (340), each of which can be aligned with one of the first magnets (330) to cause the first and the second retractable portions to retract.

(A6) In some implementations of the device of A4, the first retractable portion (e.g., shown in FIGS. 3A & 3B) is positioned at a first end of the foot (155) and the second retractable portion (e.g., shown in FIGS. 3A & 3B) is positioned at a second end of the foot (155).

(A7) In some implementations of the device of any of A1-A6, the at least one portion is made from a first material and a remainder of the foot is made from a second material.

(A8) In some implementations of the device of A7, the first material causes a first coefficient of friction between the at least one portion and an object (120) on which the base (155) is seated and the second material causes a second coefficient of friction between the remainder of the foot and the object (120) on which the base is seated.

(A9) In some implementations of the device of A8, the first coefficient of friction is higher than the second coefficient of friction.

(A10) In some implementations of the device of A8, when the at least one portion is retracted, the second coefficient of friction allows the electronic device (100) to be movable on the object (120).

(A11) In accordance with some implementations, a method of moving a foot (155) connected to an electronic device (100) includes positioning a display element movably connected to a base (155) of the electronic device (100) in a first position (e.g., shown in FIG. 3A), the first position causing the foot (155) to move from a first configuration (e.g., shown in FIG. 3A) relative to the base (155) to a second configuration (e.g., shown in FIG. 3B) relative to the base (155). The device (100) includes a magnetic element (330 & 340) for moving the foot (155) between the first configuration (e.g., shown in FIG. 3A) and the second configuration (e.g., shown in FIG. 3B), and positioning the display element in the first position (e.g., shown in FIG. 3A) causes the magnetic element (330 & 340) to move the foot (155) from the first configuration (e.g., shown in FIG. 3A) to the second configuration (e.g., shown in FIG. 3B).

(A12) In some implementations of the method of A11, positioning the display element in the second position (e.g., shown in FIG. 3B) causes the magnetic element (330 & 340) to move the foot (155) from the second configuration (e.g., shown in FIG. 3B) to the first configuration (e.g., shown in FIG. 3A).

(A13) In some implementations of the method of A11 or A12, the second configuration includes at least a portion of the foot being retracted relative to the base (150).

(A14) In some implementations of the method of any of A11-A13, the magnetic element (330 & 340) includes a first magnet (330) housed within the base (150) and a second magnet (340) housed within the display element.

(A15) In some implementations of the method of any of A11-A14, the foot (155) includes a first retractable portion and a second retractable portion, each of the first and the second retractable portions being positioned proximate to a corresponding first magnet (330).

(A16) In some implementations of the method of A15, the display element includes two second magnets (340) each of which can be aligned with one of the first magnets (330) to cause the two retractable portions to retract.

(A17) In some implementations of the method of any of A11-A16, a first portion of the foot is made from a first material and a second portion of the foot is made from a second material. The first material causes a first coefficient of friction between the retractable portion and an object (120) on which the base (150) is seated and the second material causes a second coefficient of friction between the second portion of the foot and the object (120) on which the base (150) is seated. The first coefficient of friction is higher than the second coefficient of friction and when the first portion is retracted, the second coefficient of friction allows the electronic device (100) to be movable on the object (120).

(A18) In accordance with some implementations, a method of providing a movable foot (155) for an electronic device (100) includes providing a first material and a second material, forming a first portion of the foot from the first material, forming a second portion of the foot from the second material, attaching the foot (155) to a base (150) of the electronic device, providing a magnetic element (330 & 340) for moving the foot (155) between a first configuration (e.g., shown in FIG. 3A) and a second configuration (e.g., shown in FIG. 3B), and positioning at least a portion of the magnetic element (330) proximate to the first portion.

(A19) In some implementations of the method of A18, the first portion is a retractable portion of the foot (155). The first material generates a first coefficient of friction between the retractable portion and an object (120) on which the base (150) is seated, and the second material generates a second coefficient of friction between the non-retractable portion of the foot and the object (120) on which the base (150) is placed.

(A20) In some implementations of the method of A19, the first coefficient of friction is higher than the second coefficient of friction and when the retractable portion is retracted, the second coefficient of friction allows the electronic device (100) to be movable on the object (120).

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are platform-independent, meaning that the techniques may be implemented on a variety of computing platforms having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. An electronic device comprising:
    a base;
    at least one foot, the at least one foot being movable relative to the base between a first configuration and a second configuration;
    a magnetic element for moving at least one portion of the at least one foot between the first configuration and the second configuration; and
    a display element movably connected to the base,
    wherein movement of the display element from a laptop mode to a tablet mode causes the magnetic element to move the at least one portion of the at least one foot from the first configuration to the second configuration, the tablet mode being a position during which the display element is positioned on top of the base in a manner that allows a display screen of the display element to be on top of the base and facing outward from the base,
    wherein the second configuration includes the at least one portion of the at least one foot being retracted relative to the base, and
    wherein the at least one portion is made from a first material and a remainder of the at least one foot is made from a second material, the first material causing a first coefficient of friction between the at least one portion and an object on which the base is seated and the second material causes a second coefficient of friction between the remainder of the at least one foot and the object on which the base is seated.

2. The electronic device of claim 1, wherein the magnetic element includes a first magnet housed within the base and a second magnet housed within the display element.

3. The electronic device of claim 2, wherein movement of the display element from the laptop mode to the tablet mode causes the first magnet to align with the second magnet, thereby effecting movement of the at least one portion from the first configuration to the second configuration.

4. The electronic device of claim 3, wherein the at least one portion is a first retractable portion and the at least one foot includes a second retractable portion, the first retractable portion being positioned proximate to the first magnet and the second retractable portion being positioned proximate to another first magnet.

5. The electronic device of claim 4, wherein the display element includes two second magnets, each of which can be aligned with one of the first magnets to cause the first and the second retractable portions to retract.

6. The electronic device of claim 4, wherein the first retractable portion is positioned at a first end of the at least one foot and the second retractable portion is positioned at a second end of the at least one foot.

7. The electronic device of claim 1, wherein the first coefficient of friction is higher than the second coefficient of friction.

8. A method of moving a foot connected to an electronic device, the method comprising:
    moving a display element movably connected to a base of the electronic device from a laptop mode to in a tablet mode, the movement of the display element to the tablet mode causing the foot to move from a first configuration relative to the base to a second configuration relative to the base, the tablet mode being a position during which the display element is positioned on top of the base in a manner that allows a display screen of the display element to be on top of the base and facing outward from the base,
    wherein:
        the electronic device includes a magnetic element for moving the foot between the first configuration and the second configuration,
        moving the display element to the tablet mode causes the magnetic element to move the foot from the first configuration to the second configuration,
        wherein the second configuration includes at least one portion of the foot being retracted relative to the base, and
        wherein the at least one portion of the foot is made from a first material and a remainder of the foot is made from a second material, the first material causing a first coefficient of friction between the at least one portion of the foot and an object on which the base is seated and the second material causes a second coefficient of friction between the remainder of the foot and the object on which the base is seated.

9. The method of claim 8, wherein moving the display element from the tablet mode to the laptop mode causes the magnetic element to move the foot from the second configuration to the first configuration.

10. The method of claim 8, wherein the magnetic element includes a first magnet housed within the base and a second magnet housed within the display element.

11. The method of claim 8, wherein the foot includes a first retractable portion and a second retractable portion, the first retractable portion being positioned proximate to the first magnet and the second retractable portion being positioned proximate to another first magnet.

12. The method of claim 11, wherein the display element includes two second magnets each of which can be aligned with one of the first magnets to cause the first and second retractable portions to retract.

13. The method of claim 8, wherein the first coefficient of friction is higher than the second coefficient of friction and when the at least one portion of the foot is retracted, the second coefficient of friction allows the electronic device to be movable on the object.

14. A method of providing a movable foot for an electronic device comprising:
providing a first material and a second material;
forming a first portion of the foot from the first material;
forming a second portion of the foot from the second material;
attaching the foot to a base of the electronic device;
movably attaching a display element to the base of the electronic device;
providing a magnetic element for moving the foot between a first configuration and a second configuration; and
positioning at least a portion of the magnetic element proximate to the first portion, wherein:
the first portion is a retractable portion of the foot,
the first material generates a first coefficient of friction between the retractable portion and an object on which the base is seated,
the second material generates a second coefficient of friction between a non-retractable portion of the foot and the object on which the base is placed, and
movement of the display element from a laptop mode to a tablet mode causes the magnetic element to move the first portion from the first configuration to the second configuration, the tablet mode being a position during which the display element is positioned on top of the base in a manner that allows a display screen of the display element to be on top of the base and facing outward from the base.

15. The method of claim 14, wherein the first coefficient of friction is higher than the second coefficient of friction and when the retractable portion is retracted, the second coefficient of friction allows the electronic device to be movable on the object.

\* \* \* \* \*